Dec. 29, 1970  T. S. TROJANOWSKI ET AL  3,551,013
SAFETY SHIELD CONNECTING DEVICE
Filed Feb. 17, 1969  2 Sheets-Sheet 1

INVENTOR.
THEODORE S. TROJANOWSKI
GEORGE P. WILLS
BY
Robert A. Jensen
ATTORNEY

Dec. 29, 1970     T. S. TROJANOWSKI ET AL     3,551,013
SAFETY SHIELD CONNECTING DEVICE
Filed Feb. 17, 1969     2 Sheets-Sheet 2

*INVENTOR.*
THEODORE S. TROJANOWSKI
GEORGE P. WILLS
BY Robert A. Jensen

ATTORNEY

United States Patent Office 3,551,013
Patented Dec. 29, 1970

---

3,551,013
SAFETY SHIELD CONNECTING DEVICE
Theodore S. Trojanowski, St. Catharines, Ontario, and George P. Wills, Thorold, Ontario, Canada, assignors to Hayes-Dana Limited, Thorold, Ontario, Canada, a corporation of Canada
Filed Feb. 17, 1969, Ser. No. 799,838
Int. Cl. F16d 1/00
U.S. Cl. 287—119     7 Claims

ABSTRACT OF THE DISCLOSURE

A coupling device for use with a detachable power shaft surrounded by a safety shield and which includes as an integral part of the coupling device a normally free turning means in the form of a collar for locking the detachable power shaft to the power source. This collar is further engageable with splines on the exterior of the detachable shaft, enabling an operator to quickly and easily rotate and align the detachable power shaft with a mating shaft for attachment thereto.

BACKGROUND OF THE INVENTION

The conventional tractor is ordinarily equipped with an outwardly extending power shaft which provides a source of power for driving a variety of implements connected to or mounted upon the tractor. Various efforts have been made in the past to enclose or shield the power shaft, preventing injury resulting from accidental contact with the turning shaft. The original protective shields consisted of a freely rotating straight tube permanently mounted surrounding the shaft, but have been found unsatisfactory in that they did not cover the entire shaft but only those portions easily shielded in this manner. Since an implement and tractor will often turn as separate units during use, the power shaft must bend and therefore universal joints are required. These joints or portions thereof were left exposed by this early attempt at safety shielding.

A variety of efforts were made to enclose the universal joint and a generally satisfactory means has been in the form of a segmented ball surrounding the joint and which expands and/or contracts as the universal joint bends providing complete shielding at all times.

In general, the power takeoff shaft ends shortly after it leaves the tractor or other power source and the shaft from the implement terminates with a universal joint and stub shaft designed to be locked to the power takeoff shaft. The segmented ball around the joint and tubing around the straight portions combinations makes it difficult for the operator to align the two shafts for proper securement. With this combination the entire shield rotates freely with respect to the shaft and the entire shaft is shielded.

SUMMARY OF THE INVENTION

As with any consumer product, if the apparatus is difficult to use with a safety shield the safety shield will be removed. It is one object of this invention to provide a safety shield for use on removable power takeoff shafts which fully shields the shaft and any universal joints and further includes as an integral part a means enabling an operator to easily align and connect mating shafts.

With this object in view and as a feature of the present invention there is provided a shaft enclosing safety shield including a means on the exterior of the shield for momentarily, under the operator's control, locking a portion of the shield to the protected shaft.

It is a further object of the present invention to provide a coupling device for use on a safety shield means which normally rotates freely with respect to the shaft but also may be momentarily locked to the shaft for controlled rotation of the entire combination.

In accordance with this object and as a feature of the present invention, there is provided a coupling device which normally rotates independently of the shielded shaft but which may easily be actuated by the operator and lock the coupling device to the shaft enabling rotation of the shaft by simply rotating the coupling device.

It is yet another object of the present invention to provide a coupling device for use with a shielded power takeoff shaft which simultaneously, under the operator's control, locks the coupling device to the shaft for rotation as a unit and releases a positive locking means designed to connect the detachable power takeoff shaft to the power source.

In accordance with this object and as a feature of this invention there is provided an axially moveable ring mounted upon the exterior of the safety shield which when moved in an axial direction releases the means for positively locking the detachable shaft to a shaft from the power source and locks the ring shield to the detachable shaft for simultaneous rotation, enabling the operator to easily align the interlocking portions of the mating shafts.

The above and other features of the invention including various novel details of construction and combinations of parts will now be more particularly described with reference to the accompanying drawings and pointed out in the claims.

BRIEF DESCRIPTION OF THE INVENTION

The invention will be described further in connection with the attached drawings in which.

GENERAL DESCRIPTION OF THE DRAWINGS

Figure 1:
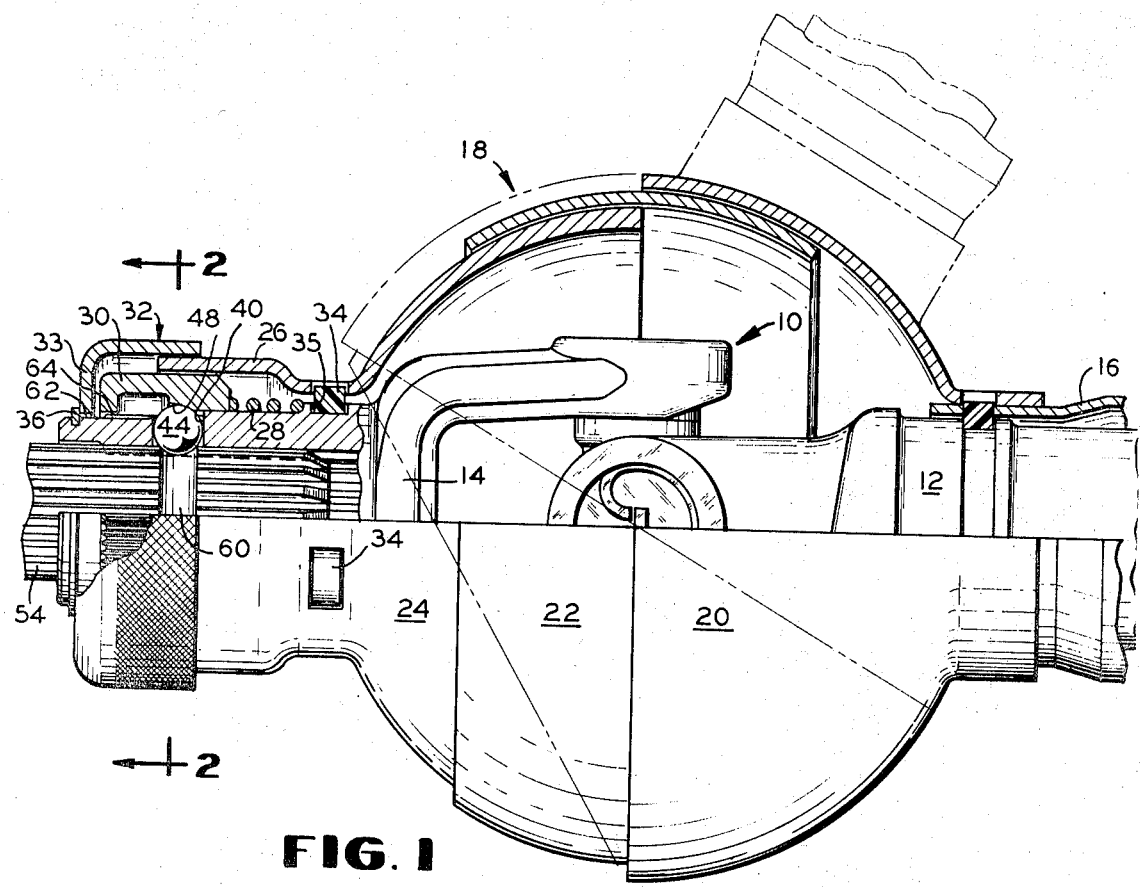
FIG. 1 is an elevation, partially broken away and partially in section, of a universal joint, the protective shield and the inventive coupling device.

As can be seen in FIG. 1, there is a universal joint, generally designated 10, connecting a shaft 12 to a stub shaft 14. Surrounding the shaft 12 and the stub shaft 14 is a protective shield 16 including a segmented ball, generally designated 18, comprising three separate sections 20, 22 and 24 and completely surrounding and flexing with universal joint 10. The segment 24 extends axially along the stub shaft 14 terminating in a flared collar 26 which forms an integral part of the inventive coupling device.

The inventive coupling device as illustrated in the drawings consists in combination the stub shaft 14, the flared collar 26 of segment 24 of the protective ball and in addition a compression spring 28 surrounding the shaft 14 beneath the collar 26, a ring 30 abutting the spring 28 and surrounding the shaft 14, and a closing collar 32 having a circumferentially inwardly extending flange 33 serving to retain the other elements in their relative positions.

The inventive coupling device is held in place upon the stub shaft by a combination of a nylon bearing 34 rotatably mounted in a groove 35 in the stub shaft 14 and a split ring 36 which is locked in groove in the exterior of the stub shaft 14 retaining the collar 32 in a position overlapping the open end of the segment 24.

The bearing 34 holds the segment 24 axially in position by snapping into slots in segment 24 in a manner known in the art while allowing free rotation relative to the stub shaft 14.

The compression spring 28 surrounds stub shaft 14 and abuts at one end against a small flange 38 immediately adjacent the groove 35 receiving the bearing 34 and abuts at the other end against the ring 30 providing an axial bias to the ring in a direction away from the universal joint 10.

Figure 2:
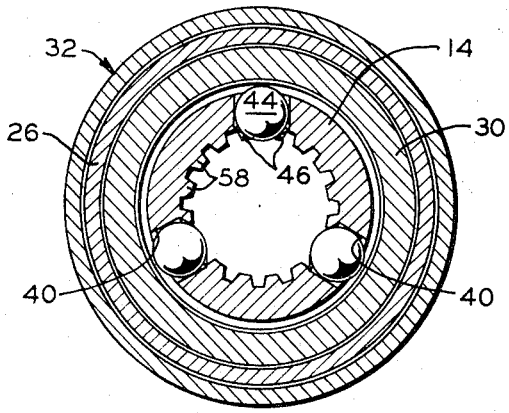
FIG. 2 is a sectional along line 2—2 of FIG. 1 with the detachable shaft separated from the power source.
Figure 3:
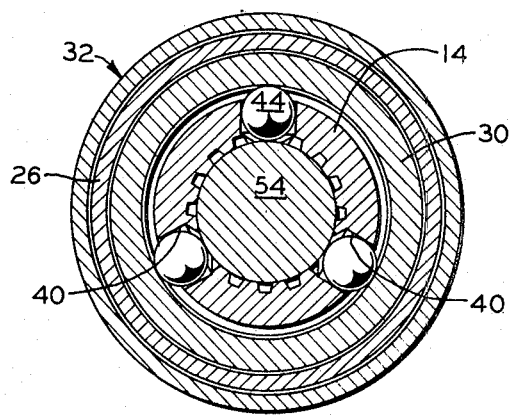
FIG. 3 is a section along line 2—2 of FIG. 1 with the detachable shaft locked to a shaft from a power source.

In the illustrative embodiment of applicant's invention the stub shaft 14 is hollow and has three evenly spaced bores 40 around its outer circumference spaced inwardly from the end, see FIGS. 2 and 3. Mounted within each one of the bores 40 is a ball 44 which is prevented from falling into the interior of the shaft by means of flanges 46 on the interior portion of each of the bores 40. The ball is prevented from accidently being removed outwardly of the shaft by the ring 30 which surrounds the shaft overlying the bores 40. The ring 30, when in operative position, is axially retained by compression spring 28 acting against the ring 30 which in turn is prevented from axial movement by either balls 44 or by the flange 33 of collar 32 in a manner as pointed out hereinafter.

The ring 30 has on its radially internal surface a cam surface 48, a groove 50.

The balls 44 in the assembled unit are captured between the flanges 46 and the ring 30. As pointed out above, the ring 30 is urged by spring 28 in an axial direction thereby preventing the balls 44 from moving radially outwardly far enough to clear the bores 40. The radially innermost position of the balls 44, as best seen in FIG. 2, has the balls resting against the flanges 46 and protruding into the inner hollow portion of the stub shaft 14.

Figure 4:
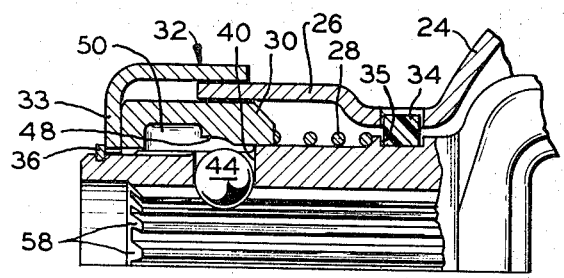
FIGS. 4–7 are a sequential showing of the relationship of the various elements during the operation of the coupling device while fastening the detachable shaft to a power takeoff shaft.

Referring now to the sequential FIGS. 4–7 the device as first seen, FIG. 4, in the normal position, not connected to a powered shaft. Note that the ring 30 is in a position outward of the universal joint, the cam surface 48 overlies the balls 44 and the balls 44 protrude into the hollow portion of stub shaft 14.

Figure 5:
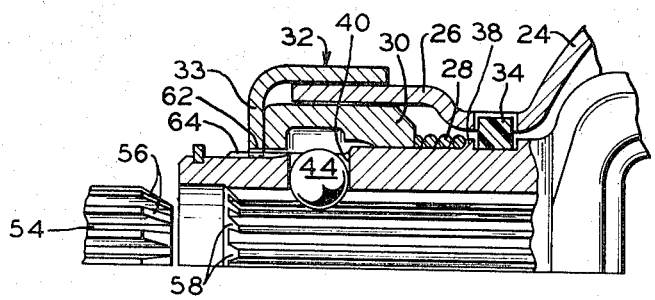

FIG. 5 depicts the inventive mechanism in a position ready to receive the powered shaft 54. The collar 32 has been urged axially toward the universal joint, forcing the ring 30 to compress spring 28 and moving the ring 30 to a position whereat the groove 50 overlies the balls 44 providing room for radially outward movement of the balls 44. Note that shaft 54 has external splines 56 which mate with the internal spline 58 of stub shaft 14, see FIG. 3.

Figure 6:
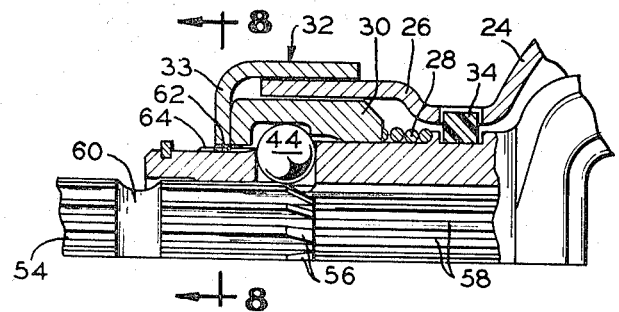
Figure 8:
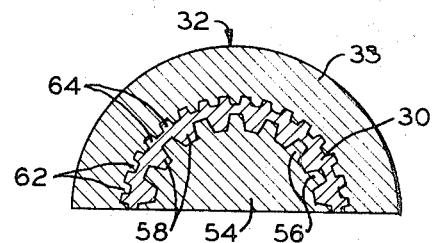
FIG. 8 is a section along line 8—8 of FIG. 6 showing interconnecting parts.

FIG. 6 depicts the apparatus in eseentially the same condition as FIG. 5 with the exception that shaft 54 has been introduced into stub shaft 14 urging the balls 44 into the groove 50 of ring 32 allowing free relative movement between shafts 54 and 14.

Figure 7:
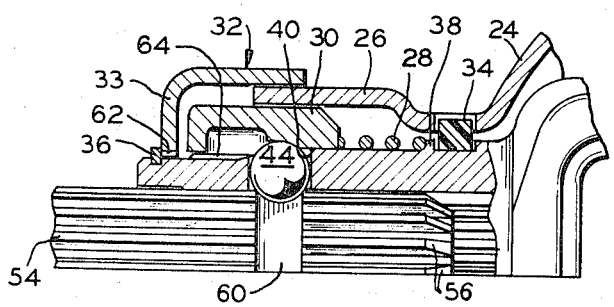

FIG. 7 depicts the inventive apparatus after the powered shaft has been positioned for operation. Note that spring 28 has again expanded moving ring 30 away from the universal joint and the cam surface 48 restrains the balls 44 in a radially inward position. The balls 44 coact with an annular groove 60 in the shaft 54 preventing relative axial movement between shafts 14 and 54.

The collar 32 includes a plurality of splines 62 on the radially innermost portion of flange 33 which coact with splines 64 upon the external surface of stub shaft 14. The combination of these splines allow an operator, when the mechanism is as shown in FIG. 5, to rotate stub shaft 14 for mating with shaft 54.

It will be understood that the particular mechanism embodying the invention is shown by way of illustration only and not as a limitation of the invention. The principles and features of this invention may be employed in varied and numerous embodiments without departing from the scope of the invention.

Having thus described our invention, what we claim as new and desire to secure by Letters Patent of the United States is:

1. In a protective shield assembly mounted upon a detachable power shaft, a shaft coupling means comprising, a first shaft, a sleeve surounding the first shaft axially fixed thereto but rotatable independently thereof, a ring mounted between the sleeve and the first shaft, means mounted to the shaft and acting upon the ring to bias the ring endwise of the shaft and a cup shaped end shield normally rotatable independently of the shaft, mounted for limited axial movement relative to the shaft and overlapping the end of the sleeve having means to rotatably lock it to the shaft when axially moved against the ring overriding the ring biasing means.

2. An assembly as in claim 1 wherein the first shaft includes means for rotationally locking it to a second shaft and separate releasable means to axially lock it to the second shaft.

3. An assembly as in claim 2 wherein the axial locking means is released when the end shield and the ring are caused to override the biasing means.

4. An assembly as in claim 1 wherein the shaft has an external spline and the end shield has a complementary internal spline, whereby the splines are meshed and the end shield and the shaft rotate as a unit.

5. An assembly as ien claim 1 wherein the shaft has a plurality of apertures and a corresponding number of captured balls which lock this shaft to a complementary shaft.

6. An assembly as in claim 1 wherein the ring has a groove to allow movement of the balls when the ring is moved by external force against the bias and a cam surface to hold the balls in one location when the external force on the ring is released.

7. An assembly as in claim 1 wherein the biasing means is a compression spring.

References Cited

UNITED STATES PATENTS

| | | | |
|---|---|---|---|
| 3,053,062 | 9/1962 | Geisthoff | 64—4 |
| 3,298,715 | 1/1967 | Stehle | 285—277X |
| 3,302,960 | 2/1967 | Herrmann | 287—119 |
| 3,357,206 | 12/1967 | Christie | 287—119X |

REINALDO P. MACHADO, Primary Examiner

A. KUNDRAT, Assistant Examiner

U.S. Cl. X.R.

64—6; 285—316